Patented Oct. 31, 1933

1,932,971

UNITED STATES PATENT OFFICE 1,932,971

METHOD OF MAKING LIGHT WEIGHT BLOCKS

Erik Hüttemann, Berlin-Wilmersdorf, and Wolfgang Czernin, Berlin-Friedenau, Germany, assignors, by mesne assignments, to Frederick O. Anderegg, Forest Hills Borough, Pa.

No Drawing. Application April 14, 1933, Serial No. 666,159½, and in Germany April 15, 1932

17 Claims. (Cl. 18—47.5)

Our invention relates to building material and particularly to heat-insulating light weight blocks with a good mechanical strength.

Light weight and heat-insulating building blocks have previously been made of naturally microporous materials which were mixed with gas or foam-producing substances before shaping the blocks, or by the inclusion of readily combustible materials. We have improved the prior methods by providing a process which produces a finished product having a very low unit weight, a high heat-insulating characteristic and good mechanical strength.

In practicing our invention we finely pulverize any one of a number of different siliceous materials, which may be calcined, and mix this finely pulverized substance with a calcareous material, which is to act as a cement or binder in predetermined relative proportions with a sufficient quantity of water to form a slurry or a plastic mass, form the same to predetermined shapes, indurate the formed shapes preferably with steam which may be under pressure and then remove the water therefrom by drying. Preferably the calcareous material too is pulverized finely before forming the mixture.

The siliceous raw materials which we may use include all of those siliceous materials which possess the ability to combine with hydrated lime when subjected to heat, for example steam under pressure. As examples of such materials we may mention here the following:—sand, clay, diatomaceous earth, shale, marl, Moler, granite, sea slime, acid or basic slag, artificial or natural pozzuolans which include calcined shales, cinders, or the like. We do not desire to specifically distinguish between these materials as their availability, first cost, and cost of preparation as well as ease of grinding or mixing, must be considered in each particular case.

As examples of the binder following calcareous materials may be mentioned: quick lime, dry or wet slacked lime, hydraulic lime, natural cement, Portland cement, Roman cement, or the like.

It is one of the essential conditions in our process that the siliceous materials and preferably the binder shall be pulverized or comminuted to a high degree of fineness in order to provide a highly microporous structure in the final product. As noted above we have found it desirable in certain materials to aid the pulverization thereof by calcining the materials before they are pulverized.

The relative proportions of the ingredients may be varied within wide limits, if care be taken that the amount of uncombined lime in the finished product after induration (hardening) thereof must be kept to a minimum, which minimum is of course preferably a zero amount. If sand or diatomaceous earth are chosen as raw material and lime as a binder we generally take about 15 to 55 parts by weight of lime on 100 parts by weight of total solid substances, dependent on the properties desired in the finished products.

The amount of water also depends on the quality of the finished products. The higher the amount of water is, the lighter blocks, plates, and the like are obtained. If for example 1000 kg. of water are used on 400 kg. of solid substances the finished product has a specific weight of about 0.4; when using, however, 1000 kg. of water on 700 kg. of solid substances the specific weight will be about 0.7.

The object of the fine pulverization of the raw materials and of the thoroughly mixing operation is to obtain a mixture which is as homogeneous as is possible, and in which the calcareous material may be combined totally. It is possible to use any one of several different known methods for pulverization, in accordance with the materials being operated on. A plastic clay for example will readily mix to a slurry when stirred energetically with the desired amount of water and calcareous materials.

Without limiting the invention thereto, it will be preferable, however, to finely pulverize the raw materials, independent of their nature and structure (granite, sand, diatomaceous earth and so on), in a ball mill and to apply the wet process, the more as water is necessary in the course of the process. The duration of the milling operation depends upon the nature of the raw materials. Preferably the calcareous materials are added a short time before the ground siliceous materials are removed from the mill; in this way the calcareous materials not only are finely pulverized too but also a very thorough mixture of siliceous and calcareous materials issues from the mill. If the raw materials are very hard and coarse it is preferred to pass them separate through a mill before mixing and milling them together with the other materials.

If siliceous materials with a natural porous structure are used, as for example diatomaceous earth, they must be treated so long that their porous structure is substantially or wholly destroyed; otherwise the mechanical strength of the finished products would decrease materially.

It is necessary, in order to obtain the result desired by us, that the slurry prepared from the finely pulverized raw materials and an excess of water be of such consistency that any harmful segregation before hardening shall be prevented. It is obvious, that such consistency cannot be readily obtained with lean materials which are lacking in colloids, or if an especially large excess of water is used to secure an exceptionally thin mixture, which will of course have a very low viscosity. Where the viscosity of the slurry is too low, it may be increased by causing it to partly thicken before further operation thereon. Thus the thin mixture may be allowed to stand for some time, or it may be stirred for a certain length of time, or the mixture may be heated, whereby a chemical reaction between the components can be effected outside of an autoclave to form a calcium hydrosilicate gel. The originally thin slurry thickens and prehardens following the appearance of a colloidal phase.

The hereinbefore mentioned calcination of certain of the siliceous raw materials has been found advantageous in this step of our process, as we have found that such calcined raw materials accelerate the prehardening of the mixture, and we have further found that it increases the mechanical strength of the finished product. It is our opinion that this calcining increases the reactivity of those materials which are treated in this way.

We have mentioned above that the mixture of finely pulverized raw materials can be heated, and in connection with this step of our process we have found that a prehardening of the mixture by treating it with steam under pressure or with a supersaturated steam, until a plastic or spreadable consistency is obtained is very valuable. When the mixture is subjected to steam pressure in an autoclave it thickens or hardens and this action is the result of the formation of a calcium hydrosilicate gel which exhibits the phenomenon of thixotrophism.

Advantage may be taken of this thixotrophic property of such a mixture to prolong the prehardening until quite a stiff or crumbly consistency is obtained. When this relatively stiff or hard mixture is stirred or beaten mechanically as in a pug mill or similar apparatus, it reverts into a softer mass or mixture, which can be more easily formed.

The slurry hereinbefore described may be further stabilized and the mechanical strength of the final product may be increased by the inclusion of a small amount of fibrous material, such as asbestos fibers, the amount being on the order of several per cent.

The mixture prepared as hereinbefore described is poured into forms of the desired dimensions and shape or the prehardened plastic mix is molded into the desired shapes either manually or in relatively simple and inexpensive forms. The molded shapes are then hardened in an autoclave for a length of time which may extend up to eight hours under steam pressure which may reach 300 pounds. We have found that during this final heating of the mixture in an autoclave the siliceous material and its binder form a stable skeleton of very fine structure which skeleton structure may be described as a three-dimensional network. This skeleton holds the excess water which was added originally to the raw materials, other than that lost during induration. The hardened shapes are then thoroughly dried, either by artificial or by natural drying, to drive out all of the water not chemically combined, thereby leaving a microporous structure of high heat-insulating value, of low unit weight, and of a mechanical strength never before secured.

Thus to give an indication of the lightness of a structure resulting from the use of our hereinbefore described process, we have been able to make blocks having a weight of 10 to 60 pounds per cubic foot, the blocks having a compressive strength of from 500 to 3,500 pounds per square inch. We do not, however, wish to be limited to these values as it may easily be possible to still further reduce the unit weight and to increase the compressive strength or blocks made in accordance with our improved process.

While we have set forth our improved process in detail and have particularly characterized the resulting product, we desire it to be understood that the claims cover all equivalents and are to be limited only by the prior art.

What we claim is:—

1. A method of making light weight heat-insulating blocks, comprising the steps of finely pulverizing a siliceous material and a calcareous binder, intimately mixing the same with water to a fluid consistency, prehardening said mixture, forming it into desired shapes, completely hardening said shapes and removing all water therefrom by drying.

2. A method of making light weight blocks of siliceous material and a calcareous binder, including the steps of finely pulverizing the raw materials, intimately mixing the pulverized siliceous material and the binder with water, subjecting the mixture to external conditions for effecting a chemical reaction therebetween, forming said mixture into desired shapes, hardening said formed shapes and removing the excess water therefrom by drying.

3. A method of making light weight blocks, which includes the steps of separately finely pulverizing a siliceous material and a calcareous binder, intimately mixing said pulverized materials with an excess of water to form a slurry, subjecting the slurry to selected external conditions for effecting a chemical reaction between the constituents, forming said mixture to produce blocks of predetermined shapes, hardening said shapes under pressure and at a temperature above room temperature and then drying out the excess water.

4. A method of making light weight blocks of siliceous material and a calcareous binder, which includes the steps of finely pulverizing the raw materials, intimately mixing them with an excess of water to make a relatively thin slurry, subjecting said slurry to predetermined external conditions to cause a chemical reaction between the constituents until a predetermined increase in the thickness of the slurry has been effected, forming said mixture into desired shapes, hardening said shapes at elevated temperature and pressure and then removing the water remaining in the hardened shapes by drying.

5. A method of making light weight blocks of siliceous material and a calcareous binder, which includes the steps of finely pulverizing the said raw materials, intimately mixing them with an excess of water to make a relatively thin slurry and in such proportion that the finished product will contain no chemically uncombined binder, subjecting said slurry to predetermined external conditions to cause a chemical reaction between the constituents until a predetermined increase in the thickness of the slurry has been effected, forming said mixture into desired shapes, hardening said shapes by subjecting them to elevated pressure and temperature and then removing the water remaining in the hardened shapes by drying.

6. A method of making light weight blocks having heat-insulating characteristics, which includes the steps of separately finely pulverizing a siliceous material and a calcareous binder, mixing the pulverized raw materials by adding the calcareous binder in from fifteen parts to fifty-five parts by weight to from eighty-five parts to forty-five parts by weight of the siliceous material and mixing this with water to form a relatively thin slurry, subjecting said slurry to predetermined external conditions to cause a chemical reaction to take place between the constituents thereof until a predetermined increase in the thickness of the slurry has been effected, forming the thickened slurry into desired shapes, hardening said shapes by subjecting them to simultaneous heat and pressure and then drying them to remove all free water.

7. A method as set forth in claim 6, characterized by the addition of a small percentage by weight of fibrous material to increase the mechanical strength of the final product.

8. A method of making heat-insulating blocks of low unit weight, which includes the steps of finely pulverizing a siliceous material and a calcareous binder, mixing these materials in a proportion varying from about five times as much siliceous material as of the calcareous binder to about equal amounts, by weight, by adding the binder to the siliceous material and then mixing this with an excess of water to form a relatively thin slurry, subjecting said slurry to predetermined external conditions to cause a chemical reaction between the constituents of the slurry and predetermined prehardening thereof, forming into the desired shapes, completely hardening said shapes by subjecting them to steam pressures of up to three hundred pounds in a closed vessel and then drying said shapes to remove all excess water.

9. A method as set forth in claim 8 in which the siliceous material is calcined before pulverizing.

10. A method as set forth in claim 8 in which the prehardened mixture is worked mechanically before being formed into the desired shapes.

11. A method as set forth in claim 8 in which the prehardening is caused by subjecting the mixture to steam pressure until it reaches a plastic consistency and then working the mixture mechanically to soften it before forming the same into the desired shapes.

12. A method as set forth in claim 8 in which the chemical reaction and the prehardening of the mixture are effected by heating the mixture under pressure.

13. A method as set forth in claim 8 in which the chemical reaction and the prehardening are accelerated by calcining the siliceous material before it is pulverized.

14. A method as set forth in claim 8 in which the chemical reaction and the prehardening are effected by stirring the mixture.

15. A method as set forth in claim 8 in which the chemical reaction and the prehardening are effected by letting the mixture stand.

16. A method as set forth in claim 8 in which the mixture of siliceous and calcareous materials and water has added thereto a small percentage of asbestos fibers.

17. A method as set forth in claim 6 in which the siliceous material is calcined before pulverizing and which includes the step of adding asbestos fibers to the slurry to stabilize the same and to increase the strength of the formed shapes.

ERIK HÜTTEMANN.
WOLFGANG CZERNIN.